Patented Sept. 9, 1924.

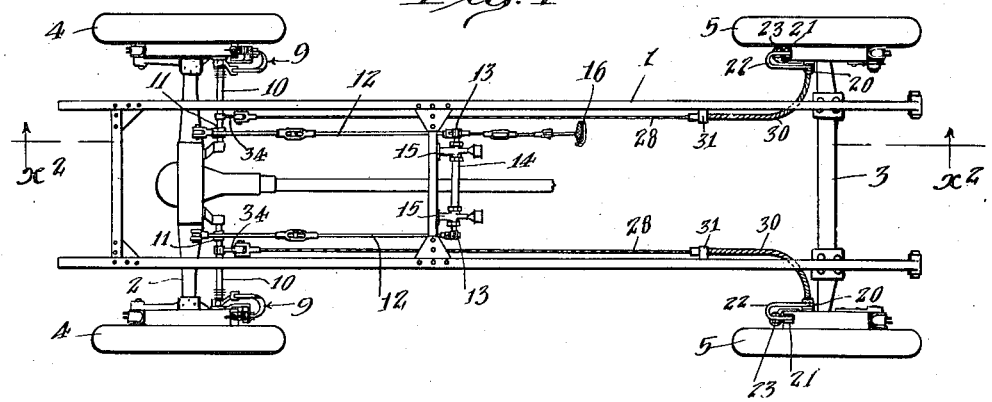

1,508,195

UNITED STATES PATENT OFFICE.

ROY SELDEN SANFORD, OF LOS ANGELES, CALIFORNIA.

VEHICLE BRAKE MECHANISM.

Application filed May 11, 1921. Serial No. 468,524.

*To all whom it may concern:*

Be it known that I, ROY S. SANFORD, a citizen of the United States, and a resident of Los Angeles, in the county of Los Angeles and State of California, have invented certain new and useful Improvements in Vehicle Brake Mechanisms, of which the following is a specification.

This invention relates to vehicle brake mechanisms, and is particularly directed to a brake mechanism associated with the steering wheels of motor vehicles.

The object of the invention is to provide a brake mechanism of the type above referred to which may be applied to any automobile, motor truck or the like, in such a manner that the operation of the brake will not interfere with the turning of the steering wheels.

Another object is to provide a steering wheel brake mechanism entirely supported by the steering knuckle and co-operating with brake operating mechanism entirely supported on the frame of the machine and operatively connected with the brake mechanism by a flexible motion-transmitting element.

A further object is to provide a simple fore-wheel brake apparatus, and to connect the front wheel brake mechanism, so that the rear wheel brake mechanism with both brake mechanisms may be simultaneously operated by a single brake-operating lever or mechanism.

Another object is to provide a steering wheel brake mechanism in which the turning of the steering wheels has no effect upon the brake effort transmitted thereto.

Various other objects and advantages will be more fully apparent from the following description of the accompanying drawings, which form a part of this disclosure, and which illustrate a preferred form of embodiment of the invention.

Of the drawings:

Figure 1 is a plan view of the chassis of an automobile with the brake mechanism of the present invention applied thereto;

Figure 2 is a longitudinal section on line $x^2$—$x^2$ of Figure 1.

Fig. 3 is an enlarged elevation of the brake mechanism of one of the steering wheels;

Fig. 4 is a section on line $x^4$—$x^4$ of Figure 3.

Fig. 5 is an elevation of the steering knuckle; and

Fig. 6 is an elevation illustrating the application of the front wheel brake as associated with the internal type of brake mechanism.

Fig. 7 is a detail of one of the forward wheels and showing another way in which the flexible connection to the knuckle may be supported.

In the standard type of front wheel construction the wheels are journaled to rotate on the spindles of steering knuckles, and the knuckles are vertically pivoted on the ends of the front axle to permit the wheels to be swung laterally in steering the vehicle. In incorporating a brake mechanism with such front wheel construction it is of major importance that the means for transmitting the movements of the brake operating mechanism on the non-swinging frame of the vehicle to the swinging wheels, must be of such a nature that the braking effort will not be affected or varied by a swinging of the wheels; also it is of prime importance that the braking effort be so transmitted and applied as to have no effect upon the free lateral swing of the wheels which would interfere with the steering of the vehicle.

Further to provide for an equalization of the braking effort it is necessary that the transmitting means be of fixed length and of such construction that such fixed length will be maintained throughout the lateral swing of the wheels.

In the preferred embodiment of the present invention the entire brake mechanism is carried by the steering knuckle and swings therewith, and the entire brake-operating mechanism is carried by the frame, with a motion-transmitting element in direct connection from the brake-operating mechanism to the brake mechanism.

With reference to the drawings, 1 designates the frame of the vehicle which has the usual spring connection with the rear axle housing 2 and with the front axle 3, the rear wheels 4 being fixed to rear axles within the housing and in driving connection with the differential in the usual manner, and the front wheels 5 being journaled upon the spindles 6 of the steering knuckles 7. The knuckles are pivoted to swing horizontally on vertical pivot pins 8 carried by the outer ends of the front axle and are connected with the usual steering mechanism; such steering mechanism is of such a well known character that it will not necessitate a detailed illustration or description of it.

The rear wheels are provided with the usual brake devices, indicated in general by the reference numeral 9, and such devices are each operated by a rock shaft 10 journaled in suitable bearings attached to the frame. Each shaft 10 is provided with an arm 11 which is connected by a link 12 with turn buckle to an arm 13 secured on a rock shaft 14, the shaft 14 being mounted to rock in brackets 15 on the frame, and one of the arms 13 being connected to a foot treadle 16.

As thus far described, the mechanism is of the standard type of rear wheel brake mechanism, and it is to be understood that various other types of rear wheel brake mechanisms may be incorporated to function with the front wheel brake mechanism of the present invention, or the brake mechanism of the present invention may be employed separately.

As the brake mechanism of both front steering wheels are of duplicate construction only one thereof will herein be described in detail. Secured to the inner side of the steering wheel 5 is a brake drum 17 and preferably formed integral with the steering knuckle 6 is a plate 18. A flexible brake band 19 surrounds the brake drum 17 and has a boss 20 at one end, a pair of outwardly projecting ears 21 at its opposite end, and a boss 20$^a$ at the side opposite said ends. Pivoted on said ears is a brake arm 22 and pivotally connected to the arm 22 is a spring bolt 23 which extends loosely through an aperture in a bracket 24 fixed to the plate 18, and through an aperture in the boss 20. A spring 25 is interposed between the boss 20 and the bracket 24 and a sleeve nut 26 threaded on the end of the bolt and engages the boss 20 and is adjustable to regulate the tension of the spring. The brake band 19 is supported on one side by a stud 21$^a$ extending through the boss 20$^a$ and carried by an arm 22$^a$ fixed on the plate 18 and the bolt 23 is supported by lock nuts 27 threaded on the bolt and normally resting upon the bracket 24, said lock nuts being adjustable on the bolt to regulate the ends of the brake band vertically relative to the brake drum, and the boss 20$^a$ being radially movable on the stud 21$^a$ to adjust the brake band radially of the drum.

Connected to the free end of the brake arm 22 is a flexible wire or cable 28 which extends downwardly through a boss 29 fixed on the plate 18 and through a flexible conduit 30 fixed to said boss and at its opposite end to the vehicle frame as indicated at guide 31 (see Fig. 2). A spring 32 serves to yieldingly maintain the brake arm 22 in normal, or released position, its tension being regulated by suitable adjusting nuts 33. The opposite end of the flexible wire or cable 28 extends rearwardly and connects with an arm 34 fixed on the shaft 11 of the rear brake mechanism and the conduit 30 is of suitable length to permit a free swing of the steering wheel in either direction.

It will be evident that a pull exerted on the cable 28 will cause the brake band 19 to frictionally grip the brake drum 17 of the front wheel and that any means other than the specific means herein shown and described, may be employed to exert such pull.

In Figure 7 I have illustrated a modified method of installation which differs from that above described in that instead of fixing the one end of the conduit to the frame 1 it is shown fixed to the front axle. In this connection it will be stated that while the forms shown are preferred, it is within the scope of the present invention to fix the one end of the conduit to swing with the wheel and to fix the opposite end to any non-swinging portion of the vehicle.

It will further be understood that with the flexible conduit disposed in a loop in a substantially vertical plane with one of its ends fixed to the frame or to the front axle and the opposite end fixed to the steering knuckle so that the wire extends from it to the lever in a direction substantially parallel with the axis of rotation of the knuckle, the lateral swing of the front wheel will have no effect upon the pull of the flexible cable 28; that is, there is substantially no difference in the distance measured through the loop, between the end of lever 22 and the guide 31.

This mechanism provides a brake device which swings with the turning of the front wheel and which has a braking effect which is equally effective for all positions of the wheel.

In Figure 6 I have shown a connection of the flexible cable 28 with an internal brake of standard construction which may if desired be associated with the front wheels instead of the external type illustrated in Figs. 1 to 5.

I claim:

1. In a fore-wheel brake for automobiles, the combination of a steering knuckle carrying a front wheel, an axle upon which the knuckle is mounted to rock on a substantial vertical axis, a frame supported by the axle, brake mechanism carried by the knuckle, means for normally holding the brake released, brake operating mechanism carried by the frame for applying the brake at will, and means connected with the brake operating mechanism, including a flexible conduit having one end attached to the knuckle in a position substantially parallel with the axis of rotation of the knuckle and having a pull wire extending from said end and connected with the brake mechanism, so that it extends and exerts its pull in a direction substantially parallel with the axis of rotation of the knuckle, said conduit being also supported on the frame and disposed in a loop in a substantially vertical plane.

2. In a fore-wheel brake apparatus, the combination of a frame having side bars, a front axle supporting the frame, a steering knuckle mounted on the axle so as to rock on a substantially vertical axis, a front wheel carried by the steering knuckle, brake mechanism associated with the wheel and including a brake drum fixed to the wheel, a brake band supported on the knuckle to cooperate with the drum, a lever having means for connecting the same with the brake band to contract the band on the drum and disposed in a front and rear plane, means for normally holding the brake band released, a flexible conduit having its forward portion disposed in a loop in a substantially vertical plane with its end attached to the knuckle and lying substantially parallel with the axis of rotation of the knuckle, said conduit having its rear portion extended along the adjacent side bar of the frame, brake operating mechanism carried by the frame, a flexible pull wire within the conduit connected at one end to the brake operating mechanism and with its other end extending from the flexible conduit and connected to the end of said lever, so as to exert its pull in a direction substantially parallel with the axis of rotation of the knuckle.

3. In a device of the nature disclosed, the combination of a frame, a rear axle, rear wheels and co-operating brake devices, a front axle, steering knuckles and front wheels, forward brake devices associated with the front wheels and carried by the steering knuckles, means on the frame for operating the rear brake devices, including a transverse horizontal rock-shaft corresponding to each rear wheel disposed adjacent to, and substantially parallel with the rear axle, located respectively at each side, and connections between said respective rock-shafts and each front wheel brake device including a flexible conduit attached at its forward end to move with the steering knuckle and with its rear portion extending along and secured to the side of the frame, and a flexible motion transmitting element longitudinally slidable within the conduit actuated by the rock shaft, for applying the forward brake devices.

4. In a brake-mechanism for applying braking power to all four wheels of an automobile, the combination of a rear brake corresponding to each rear wheel, a rock shaft corresponding to each rear wheel extending in a transverse direction and supported at the rear axle for actuating its corresponding rear brake, a forwardly disposed rock shaft with a pedal for operating the same from the driver's position, said last named rock shaft being disposed in a transverse position, means for connecting the same with the first named rock shafts for actuating the rear brakes, a steering knuckle corresponding to each forward wheel, a forward brake corresponding to each steering knuckle and supported on the steering knuckle, a pull wire leading from the rear rock shaft at each side of the automobile extending forwardly and connected with the corresponding forward wheel brake for applying the brakes, and spring means for holding the forward brakes in their released position.

Signed at Los Angeles, California, this 2d day of May, 1921.

ROY SELDEN SANFORD.

Witnesses:
CLARENCE B. FOSTER,
L. BELLE WEAVER.